3,792,051
PERYLENE-3,4,9,10-TETRACARBOXYLIC ACID-
BIS-(2-IMIDO-4-METHYLPYRIMIDINE)
Fritz Graser, Ludwigshafen, Germany, assignor to
Badische Anilin- & Soda-Fabrik Aktiengesellschaft,
Ludwigshafen (Rhine), Germany
No Drawing. Filed Mar. 17, 1972, Ser. No. 235,657
Claims priority, application Germany, Apr. 2, 1971,
P 21 16 048.5
Int. Cl. C07d 51/42
U.S. Cl. 260—256.4 N          1 Claim

ABSTRACT OF THE DISCLOSURE

Perylene-3,4,9,10-tetracarboxylic acid - bis-(2-amido-4-methylpyrimidine) which is useful as a pigment having very good fastness properties.

---

This invention relates to a new red dye of the perylene tetracarboxylic acid diimide series and its use as a pigment.

The new dye, which has very good fastness properties, has the formula:

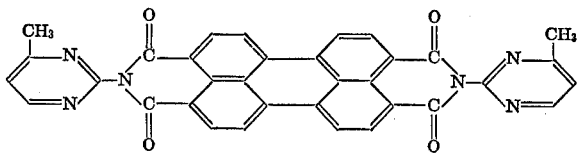

The dye may be prepared by a known method by condensation of perylene-3,4,9,10-tetracarboxylic acid or its anhydride with 2-amino-4-methylpyrimidine in a solvent or diluent such as quinoline, naphthalene or trichlorobenzene, or in an excess of 2-amino-4-methyl-pyrimidine at elevated temperature, for example at a temperature of from 180° to 230° C. The reaction is advantageously carried out in the presence of an agent which accelerates the condensation, for example zinc chloride, zinc acetate or hydrochloric acid.

The dye is isolated from the reaction mixture in a conventional manner by filtration. It is advantageous to filter the dye at elevated temperature, such as from 80° to 120° C., with or without dilution of the reaction mixture in an inert solvent, for example an alcohol such as methanol, ethanol or isobutanol, a lower carboxamide such as formamide or dimethylformamide, or an aromatic solvent such as toluene, chlorobenzene or nitrobenzene. The separated dye is then washed with an organic solvent which is miscible with water and then with water. To remove any traces of perylene tetracarboxylic acid still present, the dye may be boiled up with dilute caustic soda solution. If desired the dye may be further purified by dissolving it in sulfuric acid and reprecipitating it or by treatment such as boiling up with an organic solvent.

The dye may be brought into a finely divided form by a conventional method, for example by grinding with or without adding grinding aids such as salts, solvents or diluents or by dissolution in concentrated sulfuric acid or monohydrate followed by precipitation in water or on ice. The ground material or the finely divided aqueous filtered material obtained by dissolving followed by reprecipitation may be further treated in the form of powder or in aqueous suspension, if desired in the presence of organic solvents or diluents which are miscible with water or in an organic solvent or diluent, for example at elevated temperature and if desired at superatmospheric pressure. Special finished forms of the pigment may be obtained in this way.

As a pigment the new dye may be used for example for the production of colored surface coatings, resins, printing inks and print pastes or for the mass coloration of plastics, preferably thermoplastic compositions such as polyvinyl chloride, polyethylene, polypropylene, polystyrene and polyamide, and may be converted into a great variety of formulations. The new dye may also be used as a dope dye and as a vat dye.

The paste obtained by dissolving the dye in sulfuric acid and reprecipitating it may be used direct for the production of various pigment formulations and anhydrous formulations may also be obtained by the process known as flushing.

The new dye is a clear bluish red and has very good fastness properties, particularly very good fastness to solvents, a very good fastness to light and weathering and an excellent fastness to overspraying (overvarnishing).

As compared with the most closely comparable dye from 2-amino-pyrimidine and perylenetetracarboxylic acid (which is described in Example 10 of German Pat. 1,230,-946) the new dye has a shade which is superior tinctorially and much better fastness to overspraying. The shade and purity are particularly important for the applicability of pigments and decisive for their use.

When the dye described in Example 10 of German Pat. 1,230,946 is used in a finely divided form having high tinctorial strength (such as is obtained for example after dissolving it in concentrated sulfuric acid in the cold and precipitating it on ice) for the production of baked lacquerings, a marked displacement of shade takes place during the baking process. In contrast to this, the shade of the new dye does not change.

The following examples illustrate the invention. The parts and percentages hereinafter specified are by weight.

EXAMPLE 1

(a) 26.8 parts of crystallized zinc acetate, 73.6 parts of perylenetetracarboxylic acid and 65.6 parts of 2-amino-4-methylpyrimidine are introduced at about 100° C. into 560 parts of quinoline, heated to 225° C. over about an hour while passing thereover a weak current of nitrogen and kept at the said temperature for about four hours until a sample worked up and boiled with dilute caustic alkali solution no longer indicates perylene tetracarboxylic acid. The whole is cooled to about 120° C., filtered and washed with dimethylformamide at 100° to 120° C. until the liquid running away is clear. The filter cake is washed with water, stirred with about 600 parts of 2% aqueous caustic soda solution, heated to about 95° C., filtered and washed until neutral. Traces of any perylene tetracarboxylic acid which may have been present are thus removed. 100 parts of the dye is obtained in a very pure form.

For use as a pigment it is necessary to bring the dye into a suitable form:

(b) 40 parts of the dye obtained according to (a) is introduced into 400 parts of concentrated sulfuric acid at 0° to 5° C. and stirred until it has dissolved completely. Precipitation is then carried out on a mixture of ice and water, ice being added during the precipitation so that the temperature is kept below 10° C. After filtration and washing until neutral, an aqueous paste is obtained which is suitable for use as a pigment.

EXAMPLE 2

(a) 133 parts of the 15% dye paste obtained according to Example 1(b) is worked up into a full shade paste with 64 parts of a solvent-free alkyd resin modified with soy bean oil and 16 parts of bisethylhexyl phthalate on a three roll mill with six passes at 60 atmospheres gauge by flushing.

(b) 66 parts of binder, obtained by mixing 70 parts of solvent-free alkyd resin modified with soybean oil, 17.5 parts of bisethylhexyl phthalate and 12.5 parts of a solvent-free melamine resin are ground with 30 parts of titanium dioxide (rutile modification) and 4 parts of a colloidal silicon dioxide on a three roll mill at 60 atmospheres gauge with six passes to form a titanium dioxide paste.

(c) 0.4 parts of the full shade paste prepared according to (a) and 5 parts of the titanium dioxide paste prepared according to (b) are mixed and ground on a platetype triturator. A coating is prepared with this dye paste and is baked for forty-five minutes at 120° C. A deep colored, clear bluish red coloration of excellent fastness to light and weather is obtained.

EXAMPLE 3

1 part of the full shade paste obtained according to Example 2(a) is mixed and ground in a triturator with 3 parts of a binder (obtained by mixing 70 parts of solvent-free alkyd resin modified with soybean oil, 17.5 parts of bisethylhexyl phthalate and 12.5 parts of a solvent-free melamine resin). A coating is prepared with this dye paste and this is baked for forty-five minutes at 120° C. A deep colored clear red coloration is obtained having very good light fastness and very good fastness to overspraying.

I claim:
1. The dye of the formula:

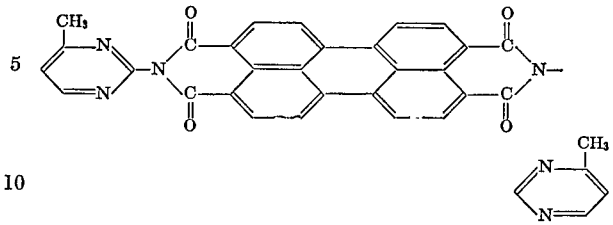

References Cited

FOREIGN PATENTS 1,230,946  12/1966  Germany.

NICHOLAS S. RIZZO, Primary Examiner

R. V. RUSH, Assistant Examiner

U.S. Cl. X.R.

106—22; 260—37 N, 40 R, 41 C

UNITED STATES PATENT OFFICE
CERTIFICATE OF CORRECTION

Patent No. 3,792,051        Dated February 12, 1974

Inventor(s) Fritz Graser

It is certified that error appears in the above-identified patent and that said Letters Patent are hereby corrected as shown below:

Column 1, line 14, "-amido-" should read -- -imido- --.

Column 4, lines 3-13,

"
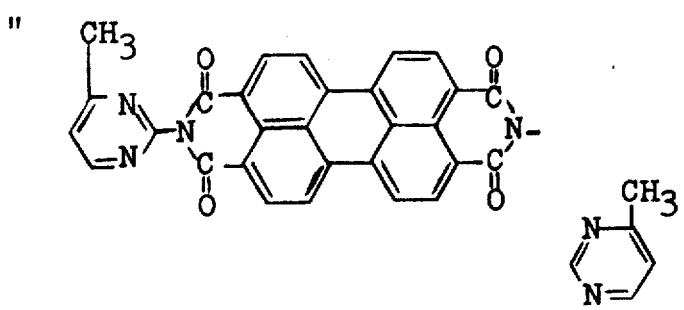
"

should read

-- 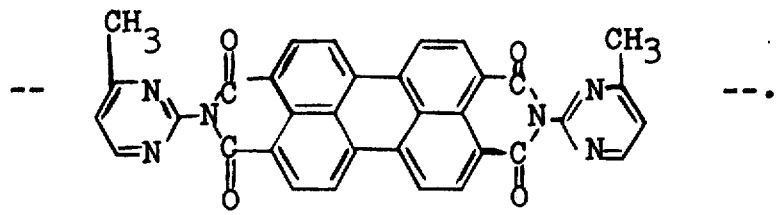 --.

Signed and sealed this 29th day of October 1974.

(SEAL)
Attest:

McCOY M. GIBSON JR.
Attesting Officer

C. MARSHALL DANN
Commissioner of Patents